INVENTOR.
HEINRICH GUHL

United States Patent Office 3,530,352
Patented Sept. 22, 1970

3,530,352
CIRCUIT FOR REGULATING THE SHAFT SPEED
OF A COMMUTATOR-TYPE MOTOR
Heinrich Guhl, Zurich, Switzerland, assignor to
Transistor A.G., Zurich, Switzerland
Filed Nov. 29, 1966, Ser. No. 597,679
Claims priority, application Switzerland, Dec. 1, 1965,
16,545/65
Int. Cl. H02p 5/40
U.S. Cl. 318—327          12 Claims

ABSTRACT OF THE DISCLOSURE

A speed control circuit for a commutator-type motor employs a thyristor connected in series with the motor and an AC source. A pulsating DC voltage 90° out of phase with the AC source is employed to controllably gate the thyristor in response to the value of a voltage proportional to the motor's speed relative to a variably settable reference voltage so as to provide continuous self-adjusting phase control of the thyristor operation for regulation of the motor speed.

---

The present invention relates to a circuit for regulating the speed of a commutator-type motor.

Commutator-type motors are often employed because their speed, while maintaining a relatively constant torque, easily can be varied: a decidedly important advantage in many uses. Moreover, referring to universal motors, small commutator-type motors up to those consuming 1000 watts can be driven off AC or DC. Differences between the construction of purely AC and purely DC motors are generally customary only with larger motors.

Formerly, it was common to control the speed of small motors with centrifugal governors connected to an "on-off" control dependent on the shaft speed. To keep manufacturing costs low most switches were operated by levers subject to centrifugal force. Such governors have a great many drawbacks. Their accuracy in operation is limited, since each switch possesses its own so-called switching path. Further, the quickness of response is limited, becase the centrifugal governor must overcome the inertia of a number of parts which it must operate. The lack of accuracy and speed causes the motors, particularly those operating in the lower and middle speed ranges, to operate with a pronounced, disadvantageous "beat" (speeding up and slowing down). Additionally, the service life of a centrifugal governor is limited, in consequence of the mechanically operated parts and the burning of the contacts.

It is therefore understandable that centrifugal governors are usable only where their imperfections are to some measure tolerable, because they are relatively inexpensive to manufacture.

Circuits employing usually thyratrons and ignitrons have since been developed, particularly for AC motors. They are substantially better than the centrifugal governor, avoiding its technical disadvantages, but are bulky and expensive and virtually cannot be used with small installations. This also holds true for switches designed for a nonsynchronous motor the input of which is connected to a frequency changer.

The object of the invention is to provide a circuit for regulating the rotational speed of a commutator-type motor, which circuit avoids the technical disadvantages of the centrifugal governor and possesses all of the practical advantages of a contactless switch, yet is no more expensive or bulky than a centrifugal governor.

This and other objects of the invention will be apparent from the following detailed description, with reference to the accompanying drawings, wherein.

Figure 1:
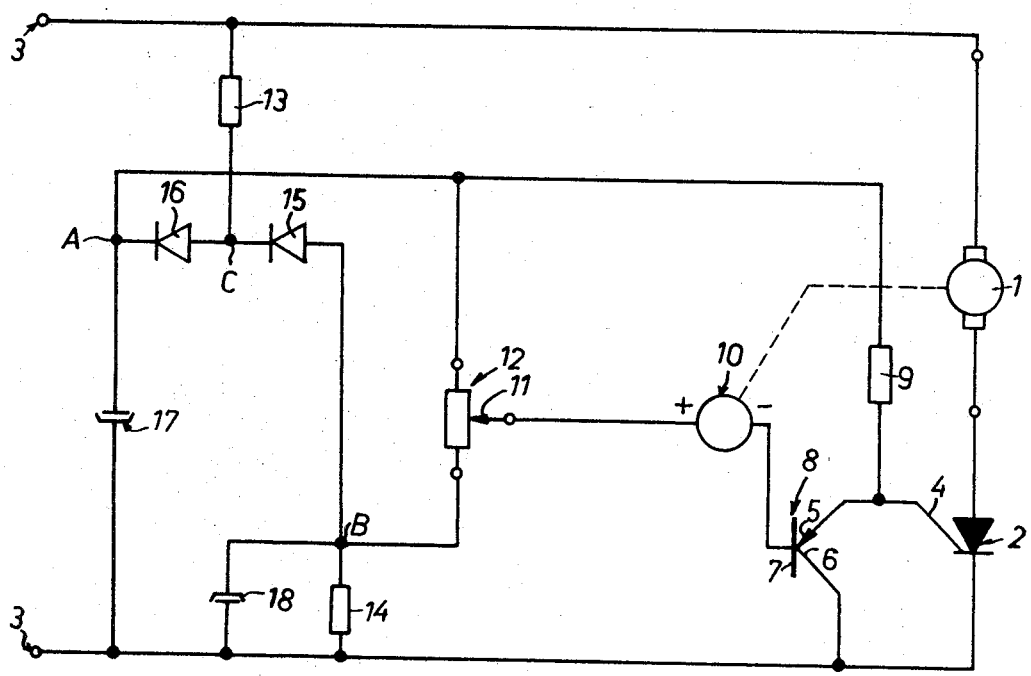
FIG. 1 is a circuit showing the principle of the invention.

Referring to FIG. 1, the motor 1 is connected in series with a controllable valve 2—such as a silicon controlled rectifier ("thyristor")—to a source 3 of AC. The gate 4 of the rectifier is connected to the emitter 5 of a transistor 8 and to a resistor 9 comprising part of a voltage divider, to be described. The collector 6 of the transistor is connected to the rectifier electrode 2 connected to one side of the AC source. The transistor base 7 is connected to one output of a tacho-generator 10 the other output of which is connected to the tap 11 of a potentiometer 12. One end of the potentiometer is connected to the voltage divider, consisting further of resistors 13, 14. The voltage divider, by means of the diodes 15, 16, connected respectively between the resistor 13 and the resistor 14 or 9, constitutes a rectifying circuit having two branches, each branch having a capacitor 17 or 18 connected in parallel with the resistor 9 or 14, respectively.

The tacho-generator 10 is connected, of course, to the shaft of motor 1 and delivers a voltage dependent on the shaft r.p.m.

The circuit operates in the following manner.

The rectifying circuit formed by the diodes 15, 16 has a positive voltage at A and a negative voltage at B. If the transistor 8 is not conducting, a current flows continuously through resistor 9 and the gate 4, whereby the rectifier is in a conductive state for every positive half-cycle of the AC source. The motor 1 is thus fed nearly the full supply voltage and consequently tends to revolve at its maximum r.p.m. The voltage (which is here DC) of the tacho-generator is proportional to the motor's r.p.m. An opposing potential, across the potentiometer 12, set at a desired value by the tap 11 opposes that of the tacho-generator. If the voltage of the tacho-generator exceeds that of the set value, the transistor 8 is rendered conducting and diverts the current necessary for firing the rectifier 2, whereby the latter no longer conducts. The motor circuit is thus opened and remains open until the set potential exceeds the voltage of the tacho-generator 10: that is, until some time during the next positive half-wave of the AC source.

If a perfectly smooth direct current were present at points A and B—which would be the case were the circuit connected to a DC source—the circuit would operate virtually instantaneously and, more importantly, would constitute an on-off control without moving contacts. With the illustrated embodiment, intended to be connected to an AC source, a continuous self-adjusting phase control of the rectifier is possible, assuring a substantially smoother operation of the motor than possible with any on-off control.

Referring to FIG. 1, the potentiometer 12 is connected to points A and B, which are at a pulsating DC voltage because of diodes 15, 16. Because of the capacitors 17, 18, these pulsations lag the AC source by approximately 90°. Thus, the voltage at tap 11 also lags the AC source by approximately 90°. From this results the so-called "vertical control" of the rectifier 2, the voltage across the anode and cathode and the voltage on the gate being 90° out of phase.

If we imagine that the diodes 15, 16 are momentarily shunted, it is obvious that by suitable choice of values for the resistor 13 and capacitor 17, 18, an alternating voltage, shifted in phase 90° with respect to the AC source, will be present at points A, B. The presence of diodes 15, 16 actually alters nothing fundamentally, there being instead at points A, B a DC voltage the ripples of which are shifted 90° with respect to the AC source.

The desired value of voltage at point B is obtained in the following manner. During the negative half-waves of the source, the resistor 13, together with the diode 15, which acts as a short circuit at this moment, and the resistor 14 form a voltage divider. The value of the desired DC voltage at B can be determined by suitable values of 13, 14. The desired amplitude of the ripples of the DC voltage at B is determined by the value of capacitor 18.

During the positive half-cycles of the AC source the diode 15 is non-conductive. Inasmuch as in this case the voltage at C equals that a A (neglecting the voltage drop through diode 16), the two diodes need simply have an inverse peak voltage rating equal to the sum of the voltages at A and B, a rating that is only a fraction of the voltage of the source.

Figure 2:
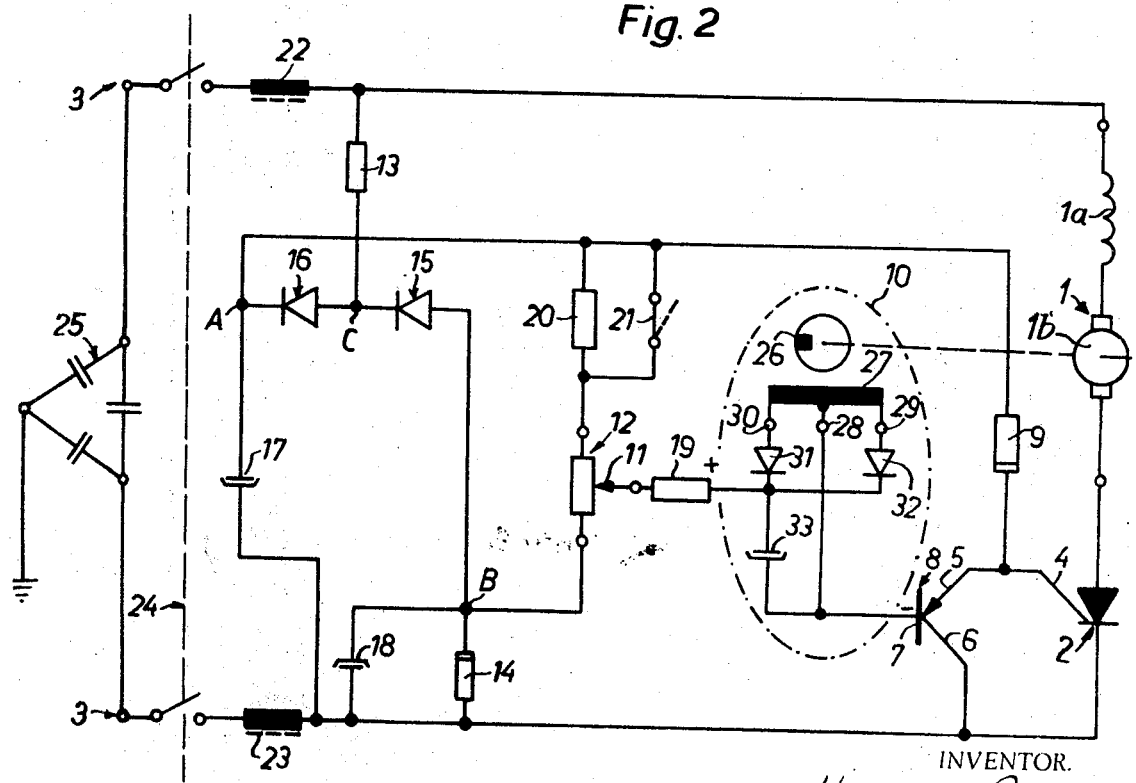
FIG. 2 is an embodiment of the invention intended particularly for the control of a universal motor for use with kitchen appliances.

FIG. 2 shows a practicable embodiment of the circuit of the invention, particularly suitable for incorporation in household appliances or in small tools. Corresponding components are given the same reference numerals as in FIG. 1. The series-wound motor 1 has its field winding 1a and armature coil 1b series connected. The tacho-alternator 10, shown schematically, is very simply constructed. A permanent magnet 26 fastened to the motor shaft turns in the vicinity of a stationary coil 27, thereby inducing a voltage therein when the motor turns. The coil 27 has a center tap 28 comprising the output of the tacho-alternator and connected to the base 7 of transistor 8. Each end 29, 30 of the coil 27 is connected to a diode 32, 31 that provides a unidirectional path for the induced alternating voltage. The cathodes of the diodes 31, 32, forming the other output of the tacho-alternator 10, are connected together to the tap 11 of potentiometer 12 via resistor 19.

Assuming that only a portion of one end of the motor shaft is exposed, which is generally the case with universal motors, a tacho-alternator of this kind can be very easily and compactly installed. It is simply necessary to cement a small permanent magnet to the shaft end, or to a member that turns with the shaft, in the vicinity of a stationary coil.

In this embodiment the potentiometer 12 is connected in series with a resistor 20 shunted by a switch 21. The purpose of this arrangement is to vary the r.p.m. range of the motor by opening and closing the switch. It is apparent that in closing the switch, the r.p.m. of the motor can be varied from nearly zero to maximum speed, whereas opening the switch lowers the maximum r.p.m. in dependence on the relative values of the resistor 20 and the potentiometer 12.

The circuit is completed by a power switch 24 and by chokes 22, 23 and capacitors 25 which serve to prevent radio interference from the motor 1.

For the sake of completeness there follows a table of values, assuming a motor drawing 500 watts at a supply voltage of 220 volts AC and having a speed range of approximately 0–15,000 r.p..m Resistors:
    9—1000 ohms
    19—2,200 ohms
    20—22,000 ohms
    13—3,900 ohms
    14—100 ohms
Potentiometer 12—5000 ohms
Capacitors:
    17—50 μf.
    18—50 μf.
    33—50 μf.
    25—2×0.0025 μf.
        1×0.3 μf.

The rectifier 2 is a silicon controlled rectifier. The diodes 15, 16, 31, 32 have a modest inverse peak voltage rating of from 20–30 volts.

Although the invention has been described with reference to a single circuit, it is possible to obtain the same or nearly the same result with other arrangements, provided that the element 2, which need not be a silicon controlled rectifier, is controlled by the difference between the set voltage and the voltage dependent on the motor's r.p.m. Thus, it is obviously a matter of choice to the man versed in the art how an adjustable set voltage is obtained and how the voltage dependent on the motor speed is obtained.

It is also obvious that the invention is not limited solely to commutator-type motors of such output and use that their speed is regulated by a centrifugal governor or by varying the supply voltage. By employing components of suitable size in the circuit, particularly rectifier 2, a commutator-type motor of any output can be controlled, particularly since all of the other components carry only a small current.

Moreover, if at least a portion of both the positive and negative half cycles of the supply current are to be used for powering the motor, two controlled rectifiers, in anti-parallel connection, or an equivalent component, connected in series with the motor do no fundamentally alter the operation of the circuit.

The invention is not to be construed as limited to the particular forms disclosed herein, since these are to be regarded as illustrative rather than restrictive.

I claim:

1. In a speed control circuit for a commutator-type motor, the combination comprising at least one thyristor having its load terminals connected in series with the motor to an AC source, means for continuously supplying a gating voltage to the gate terminal of said thyristor, means for supplying a variably settable pulsating DC voltage having a value corresponding to the desired motor speed, means for supplying a DC voltage proportional to the motor's speed, controllable switching means coupled in shunt with the thyristor gate terminal, circuit means coupling said variably settable supply means and said speed-proportional supply means to said controllable switching means for rendering said switching means conductive or nonconductive in response to the relative values of said variably settable voltage and said speed-proportional voltage so that the gating voltage applied to the thyristor gate is varied between a value sufficient and a value insufficient to fire said thyristor, said switching means being rendered conductive when said speed-proportional voltage is in a predetermined relation to said variably settable voltage indicative of excessive motor speed, said gating voltage normally being sufficient to fire said thyristor but being insufficient when said switching means is conductive, and phase shifting means for shifting the phase of said variably settable pulsating voltage by approximately 90° to the phase of the voltage of the AC source.

2. In the combination as claimed in claim 1, said circuit means including means for supplying a control voltage which is equal to said variably settable DC voltage minus said DC voltage proportional to the motor's speed, for controlling said shunt connected switching means.

3. The combination of claim 1 wherein said gating voltage is a pulsating DC voltage, and said speed control circuit includes phase shifting means for shifting the phase of said pulsating gating voltage by approximately 90° to the phase of the voltage of the AC source.

4. In the combination as claimed in claim 2, wherein said switching means comprises at least one transistor having a base, an emitter, and a collector, the base being connected to said control voltage, the emitter to said gating voltage, and the collector to one side of the AC source to complete the circuit through said transistor for said gating voltage when the transistor conducts.

5. In the combination as claimed in claim 2, wherein said means for supplying a DC voltage proportional to the motor's speed comprises a tacho-alternator associated with the motor and means for rectifying the output of said tacho alternator.

6. In the combination as claimed in claim 2, wherein said means for supplying a DC control voltage comprises a connection between said variably settable DC voltage and said DC voltage proportional to the motor's speed connecting the two voltages in opposition.

7. In the combination as claimed in claim 1, wherein said phase shifting means includes inductive filtering means in parallel with the AC source.

8. In the combination as claimed in claim 7, wherein said means for supplying a variably settable DC voltage includes an adjustable resistance means connected across at least part of the output of said inductive filtering means.

9. In the combination as claimed in claim 7, wherein said means for supplying a DC gating voltage comprise a connection to the positive side of said inductive filtering means.

10. In the combination as claimed in claim 8, including a shuntable resistor in series with said adjustable resistance means.

11. In the combinations as claimed in claim 4, wherein said means for supplying a DC voltage proportional to the motor's speed comprises a tacho-alternator and means for rectifying the output of said tacho alternator; and wherein said means for supplying a DC control voltage comprises a connection between said variably settable DC voltage and said DC voltage proportional to the motor's speed connecting the two voltages in opposition; and means connecting said control voltage to said base of the transistor.

12. In a speed control circuitf or a commutator-type motor, the combination comprising at least one controlled rectifier connected in series with the motor to an AC source, said at least one rectifier having a gate; a rectifying circuit connected across the AC source, said rectifying circuit including capacitive filtering means and the pulsating voltage output of said rectifying circuit lagging by approximately 90° the voltage of the AC source; a connection between the output of said rectifying circuit and said gate for continuously supplying a gating voltage sufficient in magnitude to fire said at least one rectifier; a resistance means in series with said connection; an adjustable resistance means connected across at least part of the output of said rectifying circuit for providing a variably settable voltage; means for providing a voltage proportional to the motor's speed; means for rectifying and smoothing said voltage proportional to the motor's speed; means for connecting said variably settable voltage and said voltage proportional to the motor's speed rectified and smoothed in opposition, whereby to provide a control voltage which is equal to said variably settable voltage minus said voltage proportional to the motor's speed rectified and smoothed; a controllable shunt comprised of at least one transistor having a base, an emitter, and a collector, said base being connected to said control voltage and said emitter to said gate, said at least one transistor conducting when said voltage proportional to the motor's speed rectified and smoothed is equal to or greater than said variably settable voltage, and said collector being connected to one side of the AC source for completing the circuit through said at least one transistor for the gating voltage when said at least one transistor conducts, said gating voltage being insufficient to fire said at least one rectifier when said at least one transistor conducts.

References Cited
UNITED STATES PATENTS

| | | | |
|---|---|---|---|
| 3,249,839 | 5/1966 | Fay | 318—327 |
| 3,257,596 | 6/1966 | Wilkins | 318—327 |
| 3,335,291 | 8/1967 | Gutzwiller | 307—88.5 |

ORIS L, RADER, Primary Examiner

T. LANGER, Assistant Examiner

U.S. Cl. X.R.

310—345